Patented Feb. 9, 1937

2,069,884

UNITED STATES PATENT OFFICE 2,069,884

PROCESS OF PREPARING FOOD PRODUCT

Edward G. Jansen, Sheboygan, Wis.

No Drawing. Application April 20, 1935, Serial No. 17,389

3 Claims. (Cl. 99—156)

My invention relates to a process of preparing a food product from potatoes and to the product thereof and has for its object the preparation of such a food product which will not deteriorate or discolor upon exposure to the air.

The product of the process is particularly adapted for use in the preparation of potato pancakes and it is herein described with particular reference to that use, however it will be evident that it may be used as the base of other articles of food or in other food preparations as well, the invention not being dependent upon the final use to which the product is put and the references herein to its use in the preparation of potato pancakes are for the purpose of demonstrating its utility rather than limitations upon its use.

Potato pancakes, prepared from the raw flesh of potatoes, grated or otherwise comminuted and mixed with other suitable ingredients, have long been known and are a highly favored article of diet. However one serious objection to their use has been the difficulty of preparing them since the grating or comminuting of the necessary potatoes, using the ordinary kitchen equipment, is an exceedingly tedious and laborious task. Moreover uncooked potatoes, particularly if finely comminuted, blacken or discolor and deteriorate rapidly upon exposure to the atmosphere and this characteristic has hitherto prevented the preparation of large quantities of comminuted potatoes by suitable production machinery for sale and use as a base for the preparation of this and similar articles of diet as might otherwise have been done.

It is the object of my invention to suitably process the potatoes so that they will not discolor or deteriorate upon exposure to the air, thus large quantities may be made up by the use of production machinery and the product sold for use as a base for making potato pancakes or similar food products or the product may be mixed with all or a part of the other ingredients necessary and sold ready for cooking.

I attain this object by the following process. The potatoes are first peeled and then, preferably, immersed in cool or cold water to soak. The length of time of this soaking is variable within wide limits however I have found that the best results are obtained when this first soaking is extended over a period of about twenty-four hours. The object of this soaking is to cleanse the potatoes and also to cause them to absorb their maximum quantity of water and the step, although desirable for the best results may be omitted under certain circumstances.

The potatoes are then removed and immersed in a treating bath of a preservative solution. Benzoate of soda, salicylic acid and other preservatives may be used, however I have found the best results to be obtained from a bath containing three percent or over of benzoate of soda dissolved in water. The time during which the potatoes remain immersed in this bath is also variable within wide limits however I have found the best results to be obtained when this treatment is continued for a period of approximately forty-eight hours.

The potatoes are then removed from the treating bath and thoroughly rinsed in cool water to remove all of the treating bath adherent thereto as well as any dirt or foreign matter not previously removed. The potatoes are then grated, macerated or otherwise treated to reduce them to a finely divided or comminuted state. This operation, as well as those previously described, may be carried out either manually or by the use of suitable machinery upon a production basis. Types of machines for performing this operation being well known and the specific means used forming no part of this invention, it is not described or illustrated herein.

The resulting product is then passed over a screen and the juice or liquid resulting from the maceration of the potatoes allowed to drain off, leaving the flesh or pulp upon the screen. It will be found that a portion of the starch originally in the potato is held in suspension or emulsion and the liquid and passes through the screen with it, the exact proportion varying with the degree of fineness to which the potatoes are grated, the amount of agitation of the pulp and liquid, etc.

This removal of a portion of the starch normally in the potato is an important feature of the process since it not only improves the keeping quality of the product and reduces the tendency to discoloration, but results in a lighter, more digestible and more palatable article of food when made into a potato pancake or similar article of food.

Flour, egg, or other desirable ingredients may be added to the pulp product in the proper proportions and the mixture fried or baked in the conventional manner to form a potato pancake or other article of food.

The product may be packed for sale, either in its original condition or with the addition of flour and other necessary ingredients, in jars, cans or other suitable containers or it may be dessicated under vacuum and packed and sold in a dry state.

I claim:

1. The process of preparing a food product comprising treating peeled potatoes with benzoate of soda, rinsing said potatoes to remove all benzoate of soda adherent thereto comminuting said potatoes and draining the resultant liquid together with the starch held in suspension therein from the solid portion thereof.

2. The process of preparing a food product comprising immersing whole peeled potatoes in a bath containing benzoate of soda, rinsing said potatoes to move all of said bath adherent thereto comminuting said potatoes and placing the resultant product on a screen whereby to drain therefrom the liquid and the starch held in suspension therein.

3. The process of preparing a food product comprising treating peeled potatoes in a bath containing approximately three percent of benzoate of soda in water, rinsing said potatoes to remove all of said bath adherent thereto, reducing said potatoes to a finely divided state in the presence of the juice or liquid derived therefrom and draining off said liquid together with the starch held in suspension in said liquid.

EDWARD G. JANSEN.